Patented Apr. 17, 1951

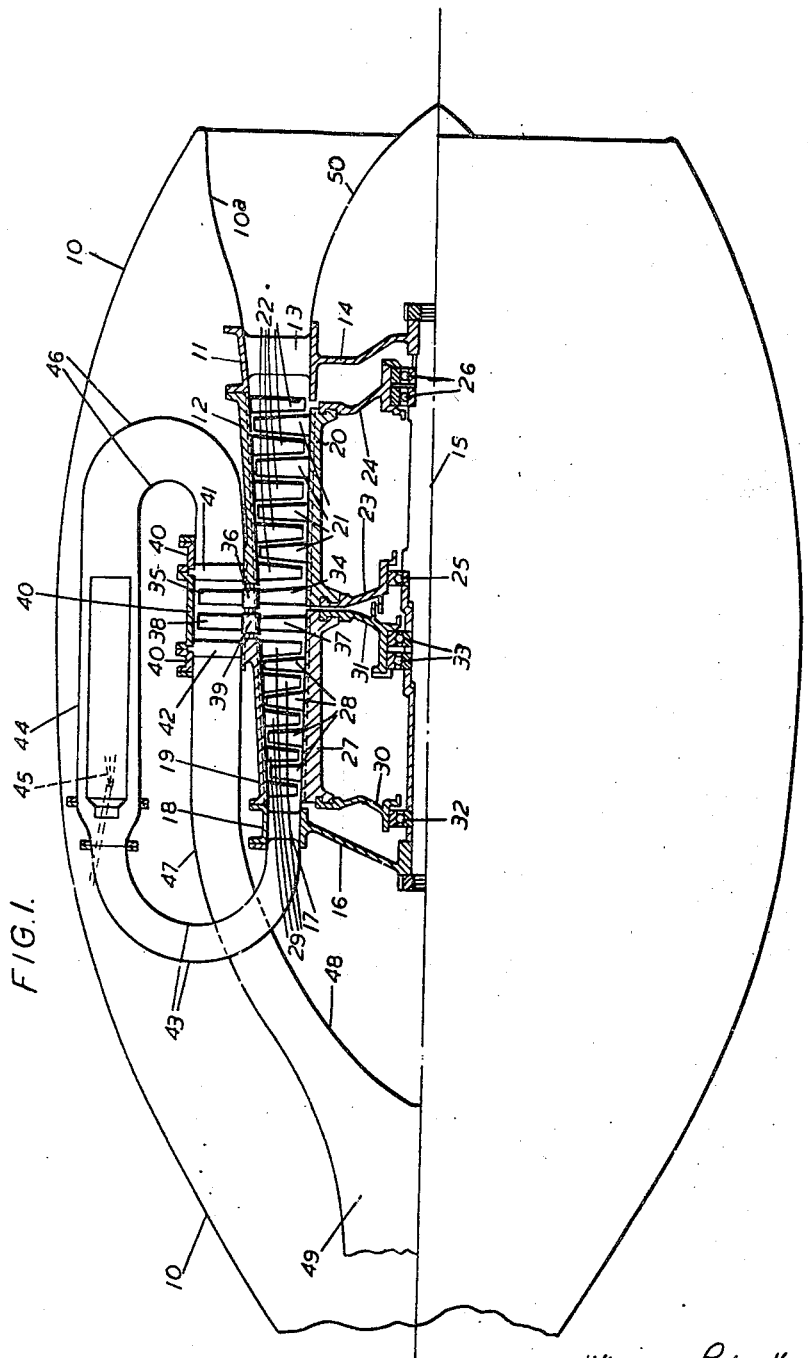

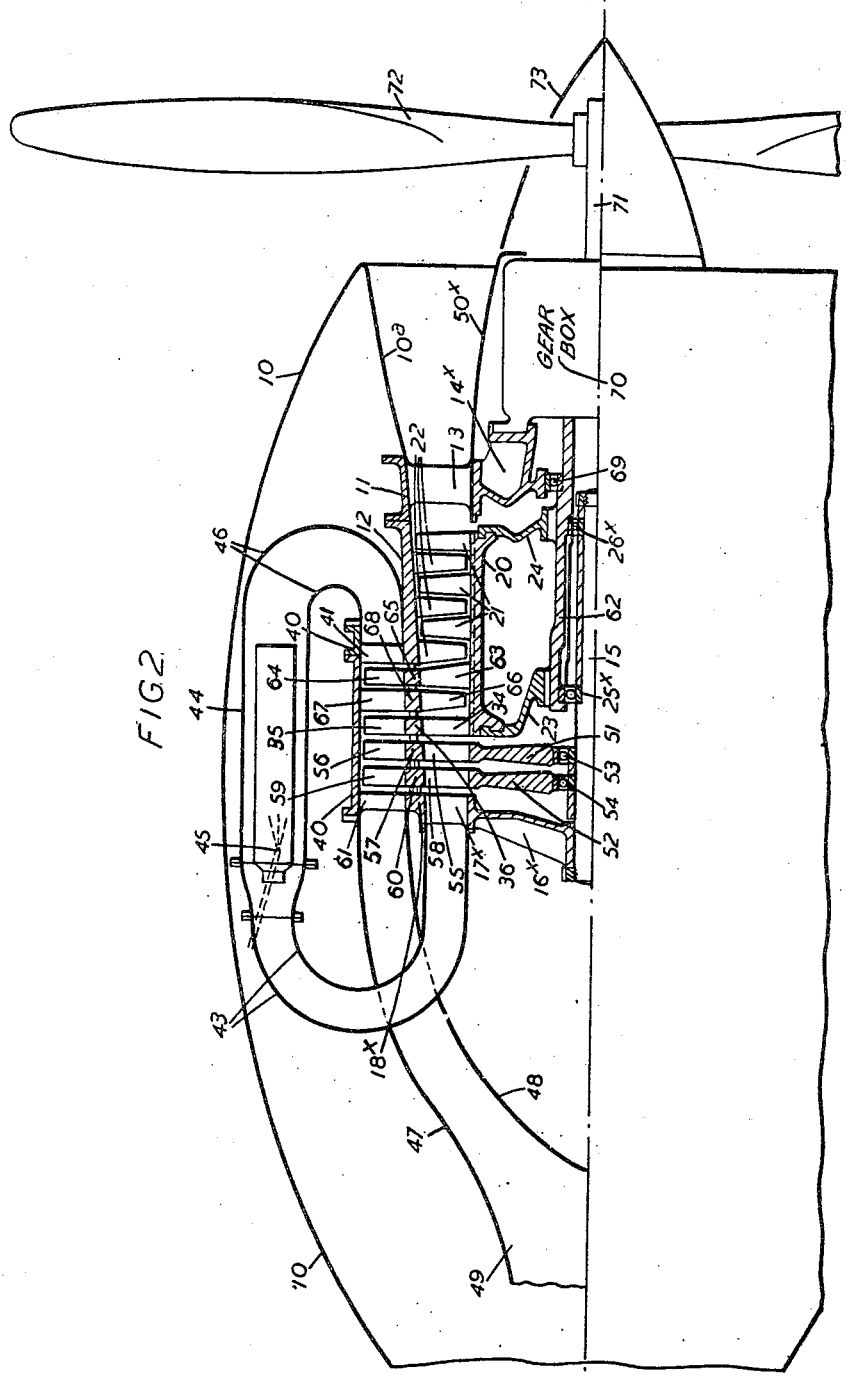

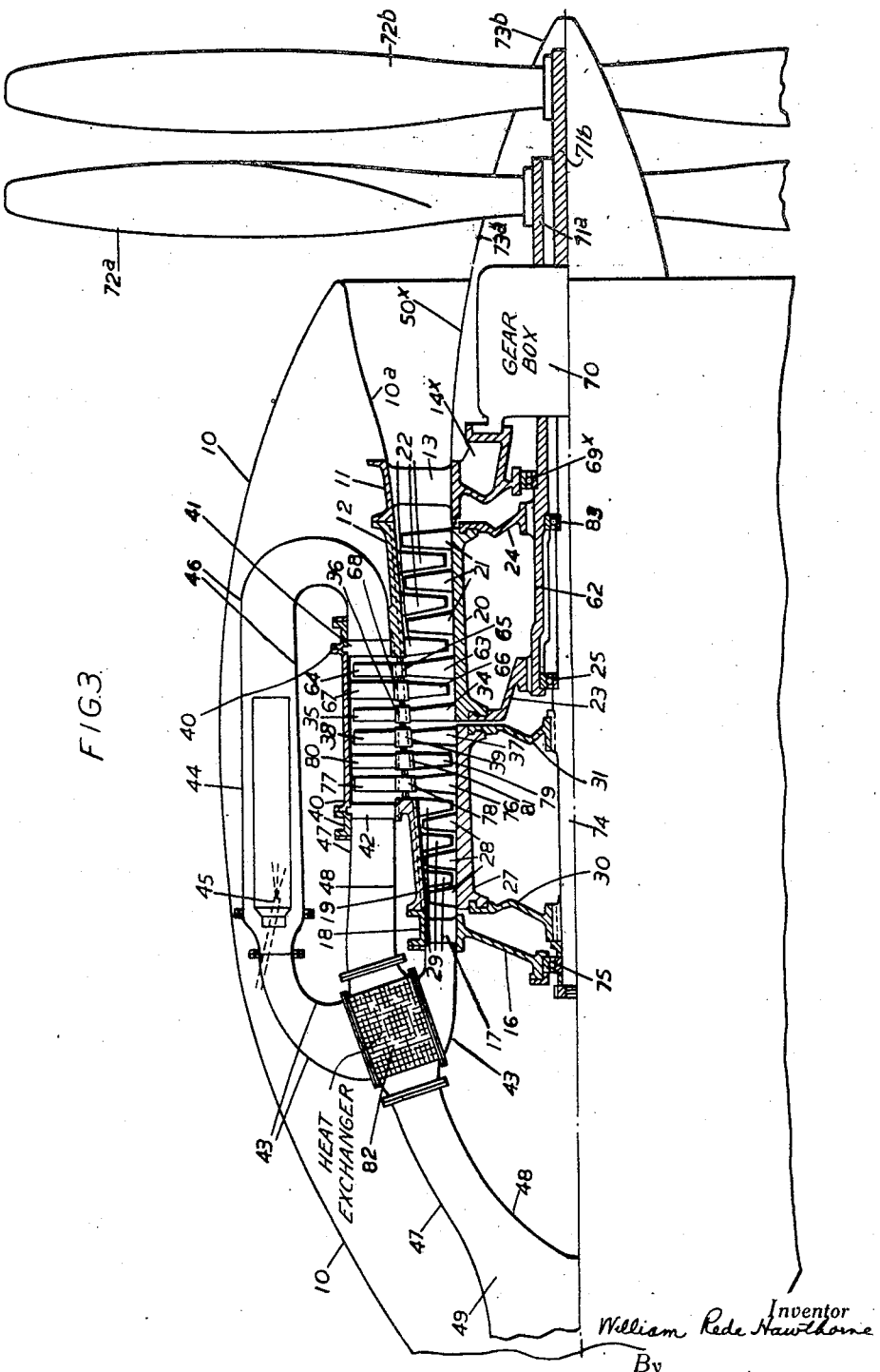

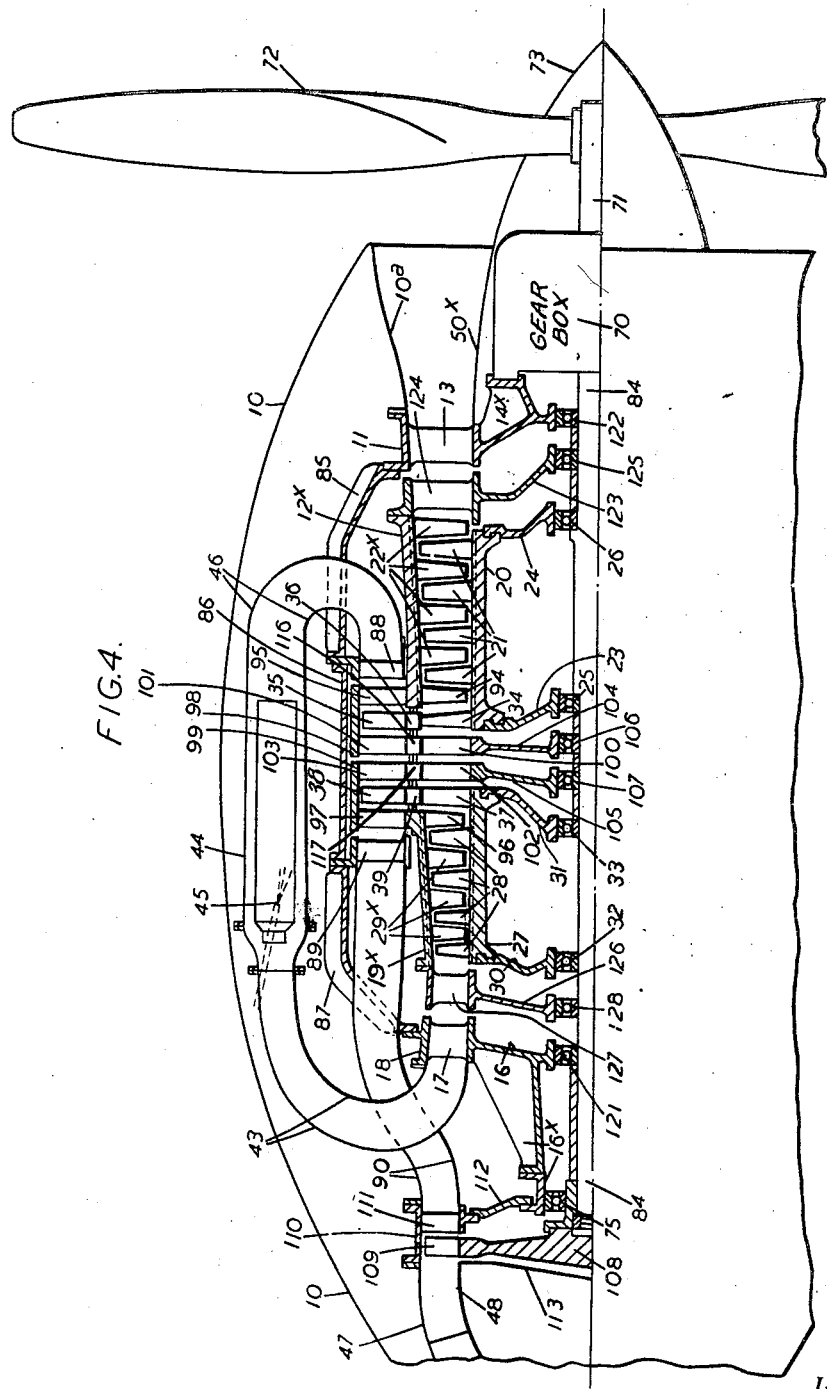

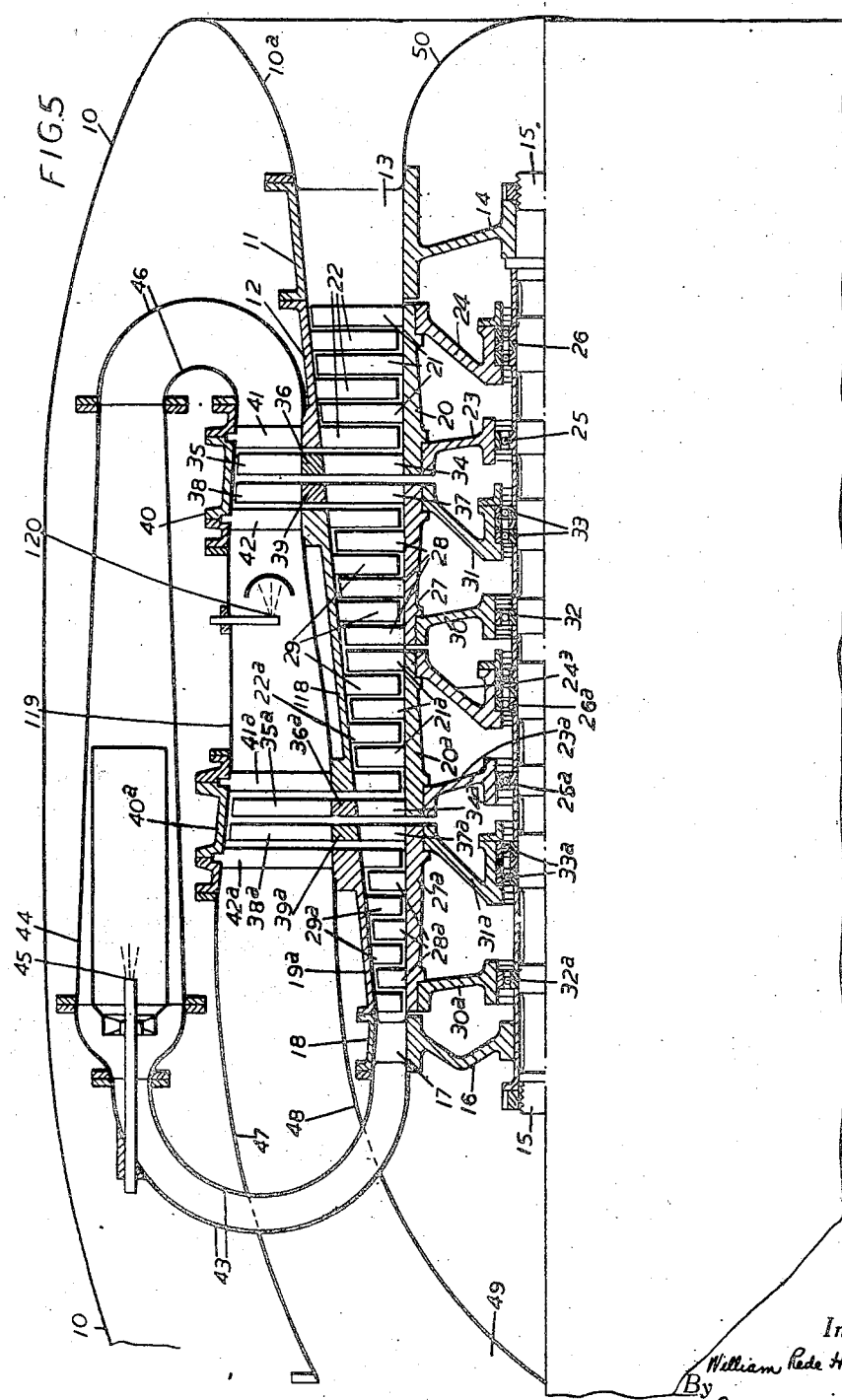

2,548,975

UNITED STATES PATENT OFFICE 2,548,975

INTERNAL-COMBUSTION TURBINE POWER PLANT WITH NESTED COMPRESSOR AND TURBINE

William Rede Hawthorne, Silver Spring, Md., assignor to Power Jets (Research and Development) Ltd., London, England, a British company Application January 31, 1945, Serial No. 575,539
In Great Britain January 31, 1944

7 Claims. (Cl. 60—35.6)

This invention relates to internal combustion turbine power plants of the kind in which air is compressed in compressor means, delivered into combustion chamber means into which fuel is injected and continuously burnt at constant pressure, and then expanded to a lower pressure through turbine means which drive the compressor means.

The invention contemplates more especially the application of a power plant of the kind above referred to as an aircraft prime mover embodying for thrust production, reaction jet means utilizing the turbine exhaust or rotary propulsive means, e. g., airscrew propeller means or ducted fan means, or a combination of rotary propulsive means and reaction jet means. The invention is, however, applicable to power plants intended for other applications such for example as traction, marine installations or electric generator plants.

An object of the invention is the provision of a power plant of the kind first herein referred to, of compact lay-out suitable for installation in confined spaces, such as aircraft nacelles or fuselages, and more particularly the attainment of compactness and limitation of axial length in an axial flow type power plant, of the kind first herein referred to, by the use of coaxially nested turbine and compressor means, arranged either for contra-flow or flow in the same direction through turbine and compressor means.

Other objects of the invention include the embodiment in a power plant of the kind above mentioned of means for propulsion by jet reaction, or of means for driving airscrew propellers or other rotary propulsion means, or any combination thereof.

Further objects of the invention include improvement of thermal efficiency by pre-heating the air charge prior to combustion by heat extracted from the turbine exhaust, the embodiment of a large number of stages of compression for obtaining a high compression ratio (which also promotes good thermal efficiency) without excessively long shafting or equivalent torque loaded elements, increasing of power output without increase of size and with little increase of weight of plant by compounding the turbine means and applying re-heat between the high and low pressure turbine means, and the elimination of torque reaction on the fixed structure of the power plant as far as is possible.

How these objects and others as may hereinafter appear are attained and how the invention may be performed will be understood from the following description given by way of example and having reference to the accompanying drawings of a number of embodiments of the invention, whose scope is defined in the appended claims.

In the drawings:

Figure 1 shows in half axial section an internal combustion turbine power plant adapted for installation in an aircraft as a jet propulsion motor.

Figure 2 is a view similar to Figure 1 of a power plant differing from that shown in Figure 1 in certain internal details and in the provision of an airscrew propeller for supplementing the jet propulsion.

Figure 3 is a view similar to Figure 1 of a power plant of similar design to that shown in Figure 1 with the addition of a pair of contra-rotating airscrew propellers for supplementing the jet propulsion, and including an exhaust heat interchanger for pre-heating the charge before combustion.

Figure 4 is a view similar to Figure 1, showing a similar power plant but with the addition of an airscrew propeller for supplementing the jet propulsion, said propeller being driven by an independent auxiliary exhaust turbine.

Figure 5 is a view similar to Figure 1 of a compound internal combustion power plant adapted for installation in an aircraft as a jet propulsion motor, and having high and lower pressure sets of turbine stages with intermediate re-heat, the arrangement of turbine and compressor elements being similar to that shown in Figure 1, but duplicated.

In Figure 1 the outer skin of the aircraft nacelle is shown at 10, the leading edge thereof being folded back on itself at 10a to define with a boss-shaped fairing 50 an annular intake to the compressor duct. The outer boundary of this duct is constituted by a stator casing built up from rings 11, 12, 18, 19 supported on a fixed shaft 15 by front and rear diaphragms 14, 16 and connecting radial webs 13, 17. The inner boundary of the compressor duct is constituted by the flanged peripheries of diaphragms 14, 16 and by rotor drums 20, 27.

The drum 20 is secured to diaphragms 23, 24 rotatably mounted on the fixed shaft 15 by means of bearings 25, 26, respectively. Similarly the drum 27 is secured to diaphragms 30, 31, rotatably supported on shaft 15 by bearings 32, 33. Clearances at the ends of the drums 20, 27 are sealed by gland means, not shown in detail.

The drum 20 carries a number of rows of compressor rotor blading 21, co-operating with rows of compressor stator blading 22, projecting inwards from the casing ring 12. These rows of blading constitute the low pressure stages of the compressor. Similarly, a number of rows of compressor rotor blading 28, mounted on drum 27 and co-operating with the rows of stator blading 29 projecting from the inside of the casing ring 19 constitute the high pressure stages of the compressor. Intermediate these two stages the drums 20 and 27 carry each a single row of two-tier blading 34, 35, 36 and 37, 38, 39, respectively, lying next to one another, of which the inner blade portions 34, 37 are formed as compressor blading providing compression stages intermediate the high and low pressure sections of the whole compressor already mentioned, and the outer blade portions 35, 38 are formed as turbine blading.

The intermediate parts 36, 39 are shroud members which, when the blading is assembled on the drums, constitute complete shroud rings separating the annular duct of the turbine from that of the compressor. Clearances between these shroud rings 38, 39 and between the said shroud rings and the adjacent casing rings 12, 19 are sealed by gland means, not shown in detail.

To complete the turbine assembly the casing rings 12, 19 carry stator blades or guide vanes 41, 42 which are secured to, or located by a built up outer turbine casing 40. The annular turbine duct is therefore defined by the casing 40 on the outside and the inner ends of the casing rings 12, 19, and the intermediate shroud rings 36, 39 on the inside.

The blades carried respectively by the rotors 20, 27 (both compressor and turbine) are of opposite hand so that the rotors 20, 27 counter-rotate.

The compressor duct, to which the radial webs 13, 17 serve as entry and exit guide vanes, is continued by a transfer duct or ducts 43, which is/are bent through an angle of 180° and deliver into a number of circumferentially spaced combustion chambers 44, in which are provided fuel injection nozzles 45. The discharge end or ends of the combustion chamber or chambers communicate, by means of another transfer duct or ducts 46, also bent through an angle at 180°, with the annular turbine duct already mentioned, which discharges into an annular exhaust duct bounded on the outer and inner sides respectively by walls 47, 48, the latter being in the form of a conical or ogival boss and beyond which the exhaust duct merges into a jet pipe 49, of cylindrical or other appropriate section, and this in turn leads to a jet reaction nozzle, not shown.

It will be seen that there are two complete reversals of flow, the flow through the compressor being from front to rear, that through the combustion chamber(s) from rear to front, and that through the turbine from front to rear again. It will also be seen that the combustion chamber(s), the turbine and the compressor are nested within one another coaxially in the order mentioned.

This arrangement provides an extremely compact unit for installation in an aircraft, the axial length of the casing, rotor drums and shafting being reduced to a minimum, thus promoting stiffness and reducing the number of bearings required.

It will also be noted that the turbine rotor blading is provided by means of rows of two-tier blading on each rotor and that the total number of turbine stages is less than the total number of compressor stages.

In this embodiment, the whole of the turbine output is used to drive the compressor and the whole propulsive effort is supplied by jet reaction of the exhaust gases from the turbine. Further, since the drums 20 and 27 and the rotor blading (both compressor and turbine) carried thereby rotate independently of one another in opposite directions, the torque reactions on the stator casing are self-balancing.

In Figure 2, the general lay-out of the installation is similar to that in Figure 1. The low pressure end of the unit is similar to that in Figure 1, corresponding parts being indicated by the same reference numbers, with the following differences.

In Figure 2 the drum 20 carries an additional row of two-tier blading comprising compressor blading 63, turbine blading 64 and shroud members 65 which assemble into a complete shroud ring similarly to the shroud members 36, 39; also the diaphragms 23, 24 instead of being supported on the shaft 15 by means of bearings, are keyed to a hollow shaft 62, rotatably supported on the shaft 15 by bearings 25x, 26x.

The shaft 62 is inserted into a gear box 70, supported on a webbed and flanged extension of a casing diaphragm 14x, and containing reduction gearing which may be of conventional type familiar to those skilled in the art, and therefore not illustrated in detail, whereby the shaft 62 drives at reduced speed a coaxial propeller shaft 71, carrying a tractor airscrew propeller 72 and spinner 73; the profile of the latter being in continuation of the forward fairing 50x, which corresponds to the dome-shaped fairing 50 of Figure 1. The forward casing member 14x also carries a bearing 69 supporting shaft 62.

In this example the high pressure section of the compressor unit comprises two contra-rotating rotor wheels 51, 52, rotatably mounted on shaft 15 by bearings 53, 54 and carrying each a row of two-tier blading, comprising compressor blading 55, 58, shroud members 57, 60 (which assemble into complete shroud rings) and turbine blading 56, 59.

Intermediate the two rows of two-tier blading 34, 35, 36 and 63, 64, 65, respectively, is inserted a single row of two-tier stator blading comprising compressor blading 66, a shroud ring 68 and turbine blading 67. This row of two-tier blading is supported from the inside of the turbine casing 40.

The rear end of the casing is constituted by a webbed diaphragm 16x secured to the shaft 15, radial webs 17x, a ring 18x separating the compressor and turbine ducts and a row of turbine stator blading or guide vanes 61, secured to the turbine casing 40.

The partition between the turbine and compressor annular ducts is therefore constituted by casing member 12, shroud rings 65, 68, 36, 57, 60 and the ring member 18x.

The clearances between all these members are sealed by gland means not shown in detail.

In other respects the description of, and reference figures applied to Figure 1 are applicable to Figure 2.

It will again be noticed that the total number of turbine stages is less than the total number of compressor stages and that the rotor blading of all turbine stages is provided by means of two-tier blading having compressor as well as turbine profiles.

In this example, part of the power of the high pressure section of the turbine is utilised to drive a propeller as well as driving the low pressure compressor section. For this reason an additional row of two-tier rotor blading is provided together with a row of two-tier stator blading.

The low pressure turbine stages 56, 59 are employed solely in providing power for the high pressure compressor stage 55, 58, and as the rotor wheels 51, 52 of this section counter-rotate, intermediate stator blading is not required. Further, the blade angles of this section are so designed that the rotor wheel 51 rotates in the opposite direction to the drum 20, thereby avoiding the need of providing stator blading between the last stage of two-tier blading 34, 35, 36 of the upstream turbo-compressor section and the first independent row of two-tier blading 55, 56, 57.

The power plant shown in Figure 3 is a development of that shown in Figure 1. In this case the rotors 20, 23, 24 and 27, 30, 31 are keyed to coaxial shafts 62, 74, the latter being supported by the rear diaphragm 16 in a bearing 75 and by a bearing 25, housed in the outer shaft 62. The latter is supported by a steady bearing 69x in the forward casing member 14x, and by a bearing (not illustrated) within the gear box 70 (corresponding to that shown in Figure 2). The coaxial shafts 74, 62 drive through appropriate reduction gearing (which may be of conventional type familiar to those skilled in the art, and therefore not illustrated), a pair of coaxial contra-rotating propeller shafts 71a, 71b carrying contra-rotating propellers 72a, 72b and spinner elements 73a, 73b.

In order to provide the power required for driving the contra-rotating propellers as well as the compressor elements the rotor drums 20, 27, each carry an additional row of two-tier blading 63, 64, 65, and 76, 77, 78, respectively, which are similar to the rows of two-tier blading 34, 35, 36 and 37, 38, 39 described with reference to Figure 1. In addition, the turbine casing 40 carries two rows of two-tier stator blading 66, 67, 68 and 79, 80, 81 positioned respectively intermediate the two rows of two-tier rotor blading carried by each of the rotor drums 20, 27.

Where the transfer ducts 43 leading from the compressor to the combustion chambers 44 cross over the ducts 47, 48 carrying the exhaust from the turbine, a heat interchanger 82 is provided, whereby some of the heat in the exhaust gases is transferred to the charge passing along the transfer ducts 43 before it reaches the combustion chambers.

The use of a heat interchanger of this kind can improve the thermal efficiency without increase of peak temperatures at the turbine blading and can give a better performance at partial load.

In other respects the embodiment of Figure 3 is similar to those of Figures 1 and 2, corresponding elements being indicated by the same reference numbers.

In the embodiment illustrated in Figure 4 the rotor drums 20, 27 are similar and similarly mounted to those shown in Figure 1, but the main shaft 84 on which they rotate is itself rotary, being mounted in bearings 75, 121, carried by a flanged and webbed extension 16x of the rear diaphragm 16.

The shaft 84 is driven by an auxiliary exhaust turbine comprising a rotor wheel 108 secured to the shaft 84 and having a single row of turbine rotor blading 109 operating within a turbine stator casing 110, which also carries a row of stator blades or guide vanes 111, whose inner ends are secured to or located by a flanged diaphragm 112 secured to the extension 16x of the diaphragm 16.

The other end of shaft 84 is supported by the front casing member 14x in a bearing 122 and drives through reduction gearing contained in a gear box 70 a coaxial propeller shaft 71 carrying a tractor propeller 72 and spinner 73, all as shown in and described with reference to Figure 2.

However, in this example the stators are replaced by rotary elements rotating in opposite directions to their associated rotors. To this end, the rotary compressor casings 12x, 19x are respectively connected by radial webs 124, 127, serving also as compressor guide vanes, with diaphragms 123, 126 which are supported by bearings 125, 128 on shaft 84. Towards their inner ends the casings 12x, 19x respectively carry rows of turbine blading 95, 97, whose outer extremities are respectively secured to outer rotary turbine shells 98, 99. Intermediate the adjacent ends of the rotor drums 20, 27 are located a pair of rotary diaphragms 104, 105, each carrying a row of double-tier blading 100, 101, 116 and 102, 103, 117, respectively, generally similar but of opposite hands to the double-tier rotor blade rows 34, 35, 36 and 37, 38, 39 carried by the drums 20, 27. The outer extremities of these double-tier blade rows are secured respectively to the rotary turbine shells 98, 99. As before, the clearances between adjacent shroud members 39, 117, 116, 36 and rotary compressor casings 12x, 19x are sealed by gland means (not shown in detail).

A built-up casing 85, 86, 87 encloses the whole assembly, the casing members 85, 87, being respectively secured to the stationary casing rings 11, 18 forming the end members of the compressor casing.

The outer casing structure 85, 86, 87 also supports entry and exit guide vanes or stator blading 88, 89 respectively for the primary turbine and the exhaust from this turbine is conveyed to the auxiliary exhaust turbine 108, 109, etc. by ducting 90, which is branched to permit the transfer ducts 43 to cross over it and permit continuity of the structural member 87.

The exhaust from the auxiliary turbine 108, 109, etc. is delivered as in the former examples into a duct, defined by members 47, 48, leading to the jet reaction nozzle (not shown).

In the example described above with reference to Figure 4, the two rotors counter-rotate both with each other and with their associated rotary casings; thus if rotor 20, etc., rotates righthandedly, rotor 27, etc., and casing 12x, etc., rotate lefthandedly and casing 19x etc. rotates righthandedly. For a given relative speed of rotor and casing, the absolute speed of rotors and casings are halved, owing to this contra-rotating arrangement and further no torque reaction (except for that of stator blading 88, 89, 111 and of the reduction gear 70) is transmitted to the fixed structure. Parts not mentioned in the foregoing description correspond to similar parts in Figures 1 and 2 and have the same reference numbers.

Figure 5 illustrates an embodiment of the invention which like that shown in Figure 1, is intended for installation in an aircraft as a purely jet propulsion power plant, no propeller or like thrust augmenting means being incorporated.

The general lay-out follows the same lines as that shown in Figure 1 and corresponding parts are indicated by the same reference numbers. In the following description, the parts whose structure and function has already been described (and their reference numbers in the drawings mentioned) with reference to Figure 1 will not be further mentioned except as may be necessary for describing the particular features of the embodiment of Figure 5.

To recapitulate the description of Figure 1, the unit therein illustrated comprises two turbo-compressor rotor drums 20, 27 respectively, carrying rows of ordinary compressor blading 21, 28 and each carrying one row of two-tier blading 34, 35, 36 and 37, 38, 39, respectively; the outer portions 35, 38 of the two-tier blades being turbine blades. The rotor drums 20 and 27 counter-rotate and are enclosed within a two-piece stator casing comprising sections 11, 12 and 18, 19, carrying stator blading 22, 29. The turbine duct is enclosed within a stator casing 40.

Referring now to Figure 5, the power plant therein shown comprises in effect two generally similar turbo-compressor units of the kind described in the preceding recapitulation of the description of Figure 1 placed end to end so that the compressor parts thereof form a continuous multi-stage compressor, and the turbine parts constitute two separate turbine units separated by a gap, each such turbine unit having two stages of counter-rotating rotor blading.

The several parts of the righthand unit (as seen in the drawing) are designated by the same reference numbers as corresponding parts in Figure 1, whereas the corresponding parts of the lefthand unit are indicated with the same reference numbers but with the addition of the suffix (a), and with this alteration, namely, that a common stator casing member 118 encloses the lefthand section of the compressor of the righthand unit and the righthand section of the compressor of the lefthand unit and supports the stator blades 29, 22a of such compressor sections.

The compressor component of the whole power plant thus comprises four compressor sections in series, each having a number of stages viz., a low pressure section comprising a rotor 20, 23, 24 with rotor blading 21, 34 and a stator 12 with blading 22; a first intermediate section comprising rotor 27, 30, 31, and rotor blading 28, 37 and a stator 118, 29; a second intermediate section with rotor 20a, 23a, 24a and blading 21a, 34a and a stator 118, 22a, and a final high pressure section comprising rotor 27a, 30a, 31a, rotor blading 28a, 37a, a stator 19a and blading 29a.

The rotors of these four compressor sections counter-rotate alternately, i.e., the rotors 20, 20a rotate in the same direction and the rotors 27, 27a rotate in the opposite direction.

As in Figure 1 the air discharge from the compressor is conveyed through a transfer duct or ducts 43 with 180° reversal of flow to a combustion chamber or chambers 44 having fuel injection nozzles 45, and the products of combustion are discharged through a further transfer duct or ducts 46 which again reverses the through flow 180° to a high pressure turbine section comprising the two rows of counter-rotating blading 35, 38 forming the outer portions of the two sets of two-tier blading carried by the rotors 20 and 27 respectively.

This turbine constitutes the high pressure component of a compound turbine combination, the low pressure component of which is provided by the two rows of counter-rotating turbine blading 35a, 38a which form the outer portions of the two rows of two-tier blading, carried respectively by the rotors 20a, 27a.

The exhaust from the high pressure turbine 35, 38, is conveyed to the low pressure turbine 35a, 38a through an annular duct or series of circumferentially spaced ducts 119, which constitute secondary combustion chambers, being provided with fuel injection nozzles 120, whereby reheat is provided intermediate the high and low pressure turbines.

The exhaust from the low pressure turbine is conveyed by an annular duct 49 defined by the duct walls 47, 48, to a jet reaction nozzle (not shown) as already described with reference to Figure 1.

As in Figure 1 the several rotors are rotatably supported by a number of bearings on a fixed shaft 15 secured to the end diaphragms 14, 16 of the stator casing.

The foregoing arrangement with its large number of compressor stages enables a very high compression ratio to be attained without excessive pressure rise in any single stage of compression and its attendant disadvantages, and the splitting of the rotor into a number of sections with independent drives avoids the structural and mechanical problems associated with a very long single rotor carrying a very large number of stages of blading, while the compounding of the turbine elements with intermediate re-heating enables the total output of the power plant to be increased without incurring prohibitive peak temperatures.

What I claim as my invention and desire to secure by Letters Patent is:

1. An axial flow internal combustion turbine power plant for installation as an aircraft prime mover, operating on the constant pressure cycle with continuous flow, comprising means defining two coaxial annular flow channels nested one within the other, of which the inner channel constitutes a compressor flow channel and the outer a turbine flow channel, combustion chamber means disposed circumferentially about said first-named means, a jet reaction nozzle situated rearwardly (with respect to the direction of motion of the aircraft) of the power plant, and duct means affording flow channels, firstly, from the rearward end of the turbine flow channel to said jet reaction nozzle, secondly, between the rearward ends of the combustion chamber means and the compressor flow channel and intersecting, or being intersected by, said first mentioned duct means, and, thirdly, between the forward ends of the combustion chamber means and the turbine flow channel; said second and third duct means each providing for substantially reversing the flow whereby the flows through the turbine and compressor channels respectively are each in the direction from front to rear, while the flow through the combustion chamber means is in a substantially reverse direction; said first named means including stator casing means and at least one rotor which carries at least one row of two-tier blades, each such two-tier blade having an inner compressor blade portion spanning the compressor flow channel and an outer turbine blade portion spanning the turbine flow channel.

2. A power plant as claimed in claim 1, wherein heat interchange means are provided in said first and second mentioned duct means at their intersection, whereby exhaust heat is transferred to the charge prior to combustion.

3. A power plant as claimed in claim 1, in which said turbine flow channel is in two axially separated portions constituting successive turbine stages, each of which is spanned by the turbine blade portion of a two-tier rotor blade, and wherein is provided duct means extending between said two portions of turbine flow channel and directing the flow from one to the other, and having means for reheating the flow between said turbine stages.

4. An axial flow internal combustion turbine power plant for installation as an aircraft prime mover, operating on the constant pressure cycle with continuous flow, comprising means defining two co-axial annular flow channels nested one within the other, of which the inner channel constitutes a compressor flow channel and the outer a turbine flow channel, combustion chamber means disposed circumferentially about said first-named means, a jet reaction nozzle situated rearwardly (with respect to the direction of motion of the aircraft) of the power plant, and duct means affording flow channels, firstly from the rearward end of the turbine flow channel to said jet reaction nozzle, secondly between the rearward ends of the combustion chamber means and the compressor flow channel and intersecting, or being intersected by, said first-mentioned duct means, and thirdly between the forward ends of the combustion chamber means and the turbine flow channel, said second and third duct means each providing for substantially reversing the flow whereby the flows through the turbine and compressor channels are each in the direction from front to rear, while the flow through the combustion chamber means is in a substantially reverse direction, said first-named means including stator casing means and at least one rotor carrying towards one end at least one row of turbine blades operating in said turbine flow channel and carrying radially inwardly of said turbine blades a greater number of rows of compressor blades operating in said compressor flow channel.

5. An axial flow internal combustion turbine power plant for installation as an aircraft prime mover, operating on the constant pressure cycle with continuous flow, comprising means defining two co-axial annular flow channels nested one within the other, of which the inner channel constitutes a compressor flow channel and the outer a turbine flow channel, combustion chamber means disposed circumferentially about said first-named means, a jet reaction nozzle situated rearwardly (with respect to the direction of motion of the aircraft) of the power plant, and duct means affording flow channels, firstly from the rearward end of the turbine flow channel to said jet reaction nozzle, secondly between the rearward ends of the combustion chamber means and the compressor flow channel and intersecting, or being intersected by, said first-mentioned duct means, and thirdly between the forward ends of the combustion chamber means and the turbine flow channel, said second and third duct means each providing for substantially reversing the flow whereby the flows through the turbine and compressor channels are each in the direction from front to rear, while the flow through the combustion chamber means is in a substantially reverse direction, said first-named means including stator casing means and at least one pair of rotors, each carrying at their adjacent ends at least one row of turbine blades operating in said turbine flow channel and each carrying radially inwardly of said turbine blades a greater number of rows of compressor blades operating in said compressor flow channel.

6. A gas turbine power plant as claimed in claim 5, in which each rotor is contra-rotational with respect to the other rotor of the pair and to the adjacent rotor of the adjacent pair of rotors.

7. An axial flow internal combustion turbine power plant for installation as an aircraft prime mover, operating on the constant pressure cycle with continuous flow, comprising means defining two co-axial annular flow channels nested one within the other, of which the inner channel constitutes a compressor flow channel and the outer a turbine flow channel, combustion chamber means disposed circumferentially about said first-named means, a jet reaction nozzle situated rearwardly (with respect to the direction of motion of the aircraft) of the power plant, and duct means affording flow channels, firstly from the rearward end of the turbine flow channel to said jet reaction nozzle, secondly between the rearward ends of the combustion chamber means and the compressor flow channel and intersecting, or being intersected by, said first-mentioned duct means, and thirdly between the forward ends of the combustion chamber means and the turbine flow channel, said second and third duct means each providing for substantially reversing the flow whereby the flows through the turbine and compressor channels are each in the direction from front to rear, while the flow through the combustion chamber means is in a substantially reverse direction, said first-named means including stator casing means and at least one pair of rotors each carrying at their adjacent ends at least one row of turbine blades operating in said turbine flow channel and one rotor of each pair carrying radially inwardly of said turbine blades a greater number of rows of compressor blades operating in said compressor flow channel and the other rotor of the pair carrying the same number of rows of compressor blades as turbine blades.

WILLIAM REDE HAWTHORNE.

REFERENCES CITED

The following references are of record in the file of this patent:

UNITED STATES PATENTS

| Number | Name | Date |
| --- | --- | --- |
| 2,085,761 | Lysholm | July 6, 1937 |
| 2,162,956 | Lysholm | June 20, 1939 |
| 2,256,198 | Hahn | Sept. 16, 1941 |
| 2,292,288 | Pateras Pescara | Aug. 4, 1942 |
| 2,360,130 | Heppner | Oct. 10, 1944 |
| 2,426,098 | Heppner | Aug. 19, 1947 |
| 2,428,330 | Heppner | Sept. 30, 1947 |
| 2,430,399 | Heppner | Nov. 4, 1947 |

FOREIGN PATENTS

| Number | Country | Date |
| --- | --- | --- |
| 99,741 | Sweden | Aug. 27, 1940 |